US012394902B2

(12) United States Patent
Shen et al.

(10) Patent No.: US 12,394,902 B2
(45) Date of Patent: Aug. 19, 2025

(54) MULTI-BAND DUAL-POLARIZED ANTENNA AND ELECTRONIC DEVICE

(71) Applicant: Huawei Technologies Co., Ltd., Shenzhen (CN)

(72) Inventors: Yunpeng Shen, Wuhan (CN); Yuzhen Zhang, Wuhan (CN); Ning Ma, Shenzhen (CN); Kemeng Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 179 days.

(21) Appl. No.: 17/926,205

(22) PCT Filed: May 7, 2021

(86) PCT No.: PCT/CN2021/092115
§ 371 (c)(1),
(2) Date: Nov. 18, 2022

(87) PCT Pub. No.: WO2021/233131
PCT Pub. Date: Nov. 25, 2021

(65) Prior Publication Data

US 2023/0178894 A1 Jun. 8, 2023

(30) Foreign Application Priority Data

May 21, 2020 (CN) ......................... 202010438253.2

(51) Int. Cl.
*H01Q 5/30* (2015.01)
*H01Q 5/378* (2015.01)
*H01Q 5/50* (2015.01)
*H01Q 9/04* (2006.01)

(52) U.S. Cl.
CPC ............... *H01Q 5/50* (2015.01); *H01Q 5/378* (2015.01); *H01Q 9/045* (2013.01)

(58) Field of Classification Search
CPC ........... H01Q 9/04; H01Q 9/045; H01Q 5/30; H01Q 5/342; H01Q 5/35; H01Q 5/378; H01Q 5/385; H01Q 5/50; H01Q 21/28
See application file for complete search history.

(56) References Cited

U.S. PATENT DOCUMENTS 7,385,555 B2 6/2008 Mahmoud et al.
8,174,454 B2 5/2012 Mayer
2006/0103576 A1 * 5/2006 Mahmoud ................ H01Q 1/28 343/700 MS (Continued)

FOREIGN PATENT DOCUMENTS

CN 101740870 A 6/2010
CN 104011935 A 8/2014

(Continued)

*Primary Examiner* — Thai Pham
(74) *Attorney, Agent, or Firm* — Slater Matsil, LLP

(57) ABSTRACT

A multi-band dual-polarized antenna includes a first radiator and a second radiator, each having a rotationally symmetric structure. The first radiator has two feeding ports that are 90° rotationally symmetric with respect to a geometric center of the first radiator. The second radiator is annular, the first radiator and the second radiator are coplanar, the first radiator is disposed in the second radiator, and an annular gap is provided between the first radiator and the second radiator.

20 Claims, 11 Drawing Sheets

(56) References Cited

U.S. PATENT DOCUMENTS

| | | | | |
|---|---|---|---|---|
| 2007/0052587 | A1* | 3/2007 | Cheng | H01Q 5/378 343/700 MS |
| 2011/0254740 | A1* | 10/2011 | Maeda | H01Q 5/40 343/700 MS |
| 2020/0106183 | A1* | 4/2020 | Fabrega Sanchez | H01Q 25/001 |
| 2021/0126372 | A1* | 4/2021 | Duan | H01Q 5/307 |
| 2022/0037790 | A1* | 2/2022 | Zhao | H01Q 9/0464 |
| 2022/0200149 | A1* | 6/2022 | Tamrakar | H01Q 9/0457 |

FOREIGN PATENT DOCUMENTS

| | | | |
|---|---|---|---|
| CN | 106329105 | B | 9/2017 |
| CN | 208028210 | U | 10/2018 |
| CN | 209104370 | U | 7/2019 |
| CN | 110429385 | A | 11/2019 |
| CN | 209948052 | U | 1/2020 |
| CN | 210074153 | U | 2/2020 |
| CN | 110994165 | A | 4/2020 |
| KR | 101727489 | B1 | 4/2017 |
| KR | 101792422 | B1 | 11/2017 |

* cited by examiner (a)

(b)

MULTI-BAND DUAL-POLARIZED ANTENNA AND ELECTRONIC DEVICE

CROSS-REFERENCE TO RELATED APPLICATIONS

This application is a National Stage of International Application No. PCT/CN2021/092115, filed on May 7, 2021, which claims priority to Chinese Patent Application No. 202010438253.2, filed on May 21, 2020, both of which are hereby incorporated by reference in their entireties.

TECHNICAL FIELD

Embodiments of this application pertain to the field of antenna technologies, and in particular, relate to a multi-band dual-polarized antenna and an electronic device.

BACKGROUND

As users have an increasingly high requirement on communication experience, an electronic device needs to have a better communication capability. The communication capability may include signal coverage and signal quality. For example, a design of an antenna in the electronic device may be optimized, so that the electronic device can provide better signal coverage (for example, simultaneously covering a plurality of frequency bands) and signal quality.

For example, the electronic device is a router that provides a wireless fidelity (Wireless Fidelity, Wi-Fi) signal. Generally, a frequency band covered by the Wi-Fi signal may include a 2.4 gigahertz (GHz) frequency band (with a frequency range of 2.4 GHz to 2.5 GHz). Because a transmission rate on 5 GHz is higher, most current routers also need to be capable of covering a 5 GHz frequency band. The 5 GHz frequency band may be further divided into a 5 G low band (Low Band, LB) (with a frequency range of 5.1 GHz to 5.3 GHz) and a 5 G high band (High Band, HB) (with a frequency range of 5.5 GHz to 5.9 GHz). To improve signal quality of the router, an antenna in the router may be configured as an antenna having a dual-polarized radiation characteristic. In addition, to ensure signal coverage of the router, the antenna further needs to be capable of covering a plurality of frequency bands such as the 2.4 G frequency band and the 5 G frequency band. Such an antenna that can cover the plurality of frequency bands and has the dual-polarized radiation characteristic may be referred to as a multi-band dual-polarized antenna.

Obviously, the multi-band dual-polarized antenna becomes a better choice for optimizing the communication capability of the electronic device.

SUMMARY

Embodiments of this application provide a multi-band dual-polarized antenna and an electronic device. Complexity and processing costs of the antenna can be effectively reduced while multi-band dual-polarized radiation is implemented, and space required by the antenna is significantly reduced, so that the multi-band dual-polarized antenna can be more widely used in electronic devices. In an example, the multi-band dual-polarized antenna provided in this application can be used in an electronic device such as a router, a data card, or wireless customer premises equipment (Customer Premise Equipment, CPE), and is configured to support a corresponding device in performing multi-band dual-polarized radiation.

To achieve the foregoing objectives, the following technical solutions are used in embodiments of this application.

According to a first aspect, a multi-band dual-polarized antenna is provided. The antenna includes a first radiator having a rotationally symmetric structure and a second radiator having a rotationally symmetric structure. The first radiator has two feeding ports that are 90° rotationally symmetric with respect to a geometric center of the first radiator. The second radiator is annular, the first radiator and the second radiator are coplanar, the first radiator is disposed in the second radiator, and an annular gap is provided between the first radiator and the second radiator.

Based on this solution, the radiators are disposed on a same plane, so that the radiators of the multi-band dual-polarized antenna need only one plane, thereby facilitating processing and reducing costs. In addition, the second radiator and the annular gap can respectively work in different frequency bands, to ensure multi-frequency coverage. In addition, the feeding ports, the first radiator, and the second radiator are correspondingly disposed, to ensure a dual-polarized radiation characteristic of the antenna in each operating frequency band.

In some possible designs, an operating frequency band of the second radiator is a first frequency band, and an operating frequency band of the annular gap includes a second frequency band. Based on this solution, it is clarified that in the antenna provided in the first aspect, the second radiator can be configured to support coverage of the first frequency band, and the annular gap can be configured to support coverage of the second frequency. In an example, the second radiator may be configured to cover a 2.4 GHz high band and/or a 5 GHz high band, and the annular gap may be configured to cover a 5 GHz low band.

In some possible designs, the operating frequency band of the second radiator further includes a third frequency band. Based on this solution, the second radiator can additionally cover an operating frequency band, that is, the third frequency band, based on the description provided in the first aspect. For example, the third frequency band may be a frequency band covered by frequency multiplication of the first frequency band. In this way, the multi-band dual-polarized antenna can cover more frequency bands.

In some possible designs, a size of an outer contour of the second radiator is twice a wavelength corresponding to the first frequency band, and a perimeter of the annular gap is twice a wavelength corresponding to the second frequency band. Based on this solution, a debugging method for achieving a coverage required frequency band by adjusting a size of the multi-band dual-polarized antenna is provided. For example, the first frequency band may be covered by adjusting a size of an outer contour of the second radiator, and the second frequency band may be covered by adjusting a size of the annular gap.

In some possible designs, a width range of the annular gap is [0.5 millimeter to 1.5 millimeters]. Based on this solution, a size requirement, that is, between 0.5 mm and 1.5 mm, for radiation capable of correctly exciting the annular gap is provided. In some embodiments, a width of the annular gap may be 0.7 millimeter or 0.8 millimeter.

In some possible designs, the antenna further includes a reference ground disposed in parallel with the first radiator, and a distance range between the reference ground and the first radiator is [3 millimeters to 7 millimeters]. Based on this solution, the reference ground is disposed, so that the antenna can radiate more stably. In addition, because the reference ground is located on one side of a plane on which the first radiator and the second radiator are located, a mirror effect can be implemented, that is, an electromagnetic wave generated during radiation of the antenna is reflected in a direction opposite to a direction in which the reference ground is disposed. This enhances lightness of a signal in a corresponding direction. In some embodiments, a distance between the plane on which the first radiator is located and the reference ground may be 5 millimeters.

In some possible designs, a projection area of the second radiator on the reference ground is smaller than an area of the reference ground. Based on this solution, the reference ground can effectively provide a 0-level reference for radiation of the antenna, thereby ensuring stable radiation of the antenna.

In some possible designs, the first radiator is made of a square conductive material, and a length of each side of the first radiator is a quarter of the wavelength corresponding to the second frequency band. Based on this solution, a specific implementation is provided, that is, the first radiator is of a square structure. In addition, the size of the first radiator is set according to the wavelength corresponding to the second frequency band, so that the size of the annular gap formed between the first radiator and the second radiator corresponds to the second frequency band. In this case, the first radiator can radiate corresponding to the second frequency band.

In some possible designs, the second radiator is made of a square ring-shaped conductive material that is hollow inside, and the length of the outer contour of the second radiator is a quarter of the wavelength corresponding to the first frequency band. Based on this solution, a specific implementation is provided, that is, the second radiator is of a square ring structure. In addition, because the size of the second radiator is set according to the wavelength corresponding to the first frequency band, the second radiator can radiate corresponding to the first frequency band.

In some possible designs, a gap is provided on each side of the outer contour of the second radiator, and the gap has an outward opening. Based on this solution, a method for adjusting a peripheral electrical length of the second radiator (for example, increasing the peripheral electrical length) without significantly increasing an area of the second radiator is provided. For example, a non-run-through gap may be provided on each side of the outer contour of the second radiator, and each gap has an outward opening. In this way, an electrical length of a current at the outer contour of the second radiator can be increased, thereby lowering an operating frequency band with a corresponding resonance. In this way, a frequency band to be covered is accurately covered.

In some possible designs, the second radiator is a passive parasitic structure. Based on this solution, a working mechanism of the second radiator can be determined, that is, the second radiator and the first radiator are separated from each other, and no feeding port needs to be disposed on the second radiator. When the antenna works, the second radiator does not need to be directly fed, but is fed by coupling through the first radiator and the annular gap.

According to a second aspect, an electronic device is provided, including the multi-band dual-polarized antenna according to any one of the first aspect and the possible designs of the first aspect. In some implementations, the electronic device may further include another component configured to cooperate with the multi-band dual-polarized antenna to work. For example, for each multi-band dual-polarized antenna in the electronic device, a corresponding radio frequency module may be disposed. The radio frequency module may provide two MIMO signals that are fed to the first radiator by using two ports of the corresponding antenna. In this way, the antenna performs multi-band dual-polarized radiation on the MIMO signals.

In some possible designs, the electronic device feeds a multiple-input multiple-output MIMO signal to the multi-band dual-polarized antenna through two feeding ports disposed therein. Based on this solution, an application scenario of a multi-band dual-polarized antenna is provided, that is, when a MIMO signal is fed, the MIMO signal is radiated.

DETAILED DESCRIPTION OF ILLUSTRATIVE EMBODIMENTS

Dual-polarized antennas have been widely used because the dual-polarized antennas can provide better signal quality. An antenna having a dual-polarized radiation characteristic can simultaneously radiate two electromagnetic waves whose phases are perpendicular to each other. With a phase difference of 90°, the two electromagnetic waves can be transmitted in space at the same time without mutual interference. Therefore, the dual-polarized antenna can radiate/receive more information than a common antenna at the same time, so that signal quality is optimized and a throughput is improved.

In the conventional technology, dual-polarized radiation of an antenna may be implemented through coupled feeding. For example, two radiators a that are perpendicular to each other may be used as feeding ends for coupled feeding, to feed an electrical signal to another radiator b close to the radiators a through spatial coupling. The radiator b can radiate two orthogonal electromagnetic wave signals that work in a same frequency band and have a phase difference of 90°, to excite currents perpendicular to each other on the radiator b. In this way, dual-polarized radiation of the antenna is implemented.

Figure 1:
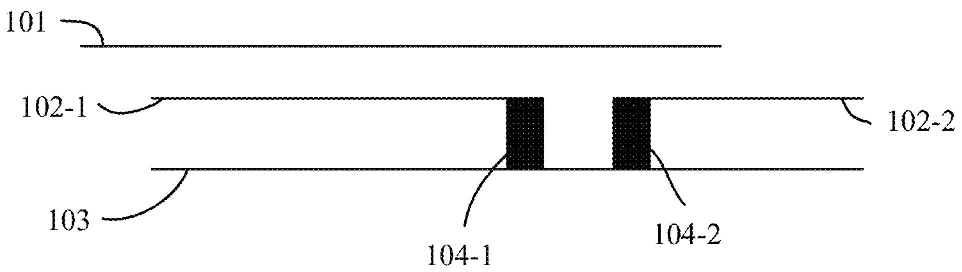
FIG. 1 PRIOR ART
FIG. 1 is a schematic diagram of a structure of a dual-polarized antenna.
Figure 1:
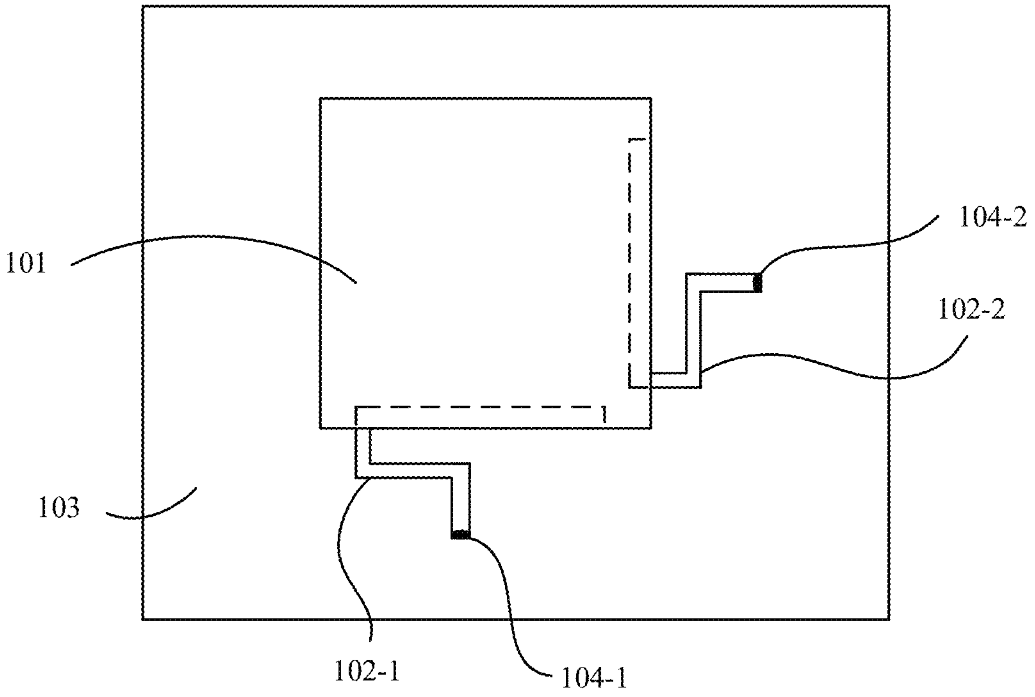
FIG. 1 PRIOR ART

For example, FIG. 1 is a schematic diagram of a structure of a dual-polarized antenna according to the conventional technology. (a) in FIG. 1 shows a side view of the dual-polarized antenna, and (b) in FIG. 1 shows a top view of the dual-polarized antenna.

As shown in (a) in FIG. 1, the dual-polarized antenna has a three-layer structure: a substrate 103, radiators a 102-1 and a 102-2 made of a conductive material, and a radiator b 101 made of a conductive material. Two feeding terminals 104-1 and 104-2 are led out from the substrate 103, and are respectively coupled to 102-1 and 102-2, to perform feeding on the radiators a.

Refer to (b) in FIG. 1. The radiator b 101 in this example is in a regular quadrilateral shape, a part of the radiator a 102-1 and a part of the radiator a 102-2 each overlap a vertical projection of the radiator b 101, and the part of 102-1 and the part of 102-2, which overlap the projection of 101, are perpendicular to each other. When an electrical signal is fed to 102-1 through 104-1, 102-1 may be spatially coupled to excite a transverse current on a lower edge of 101. Similarly, an electrical signal may be fed to 102-2 through 104-2, and 102-2 may be spatially coupled to excite a longitudinal current on a right edge of 101. In this way, currents in two directions that are perpendicular to each other may generate two electromagnetic waves whose phases are orthogonal to each other respectively. This implements a dual-polarized radiation characteristic of the antenna.

It can be learned that in the antenna structure shown in FIG. 1, an effective radiator participating in radiation is the radiator b 101. Therefore, the antenna can work only in one frequency band corresponding to a size of the radiator b 101. However, an antenna usually needs to be capable of simultaneously covering a plurality of frequency bands. For example, a Wi-Fi antenna supporting 5 G Wi-Fi needs to be capable of simultaneously covering three frequency bands: a 2.4 G frequency band, a 5 G low band, and a 5 G high band. If the foregoing solution is used, an independent antenna needs to be disposed for each frequency band. As a result, a quantity of antennas increases, resulting in increase of costs. Because the antenna has a three-layer structure, a processing technology of the antenna is complex, and a requirement of the antenna for longitudinal space is high. All the foregoing problems limit application of the dual-polarized antenna in electronic devices.

To solve the foregoing problems, embodiments of this application provide a multi-band dual-polarized antenna, to effectively reduce antenna complexity and processing costs while implementing multi-band dual-polarized radiation, and significantly reduce space required by the antenna. The multi-band dual-polarized antenna can be more widely used in electronic devices. In an example, the electronic device may be a router, data card, CPE, or the like.

The following describes in detail the multi-band dual-polarized antenna provided in embodiments of this application with reference to the accompanying drawings.

Figure 2:
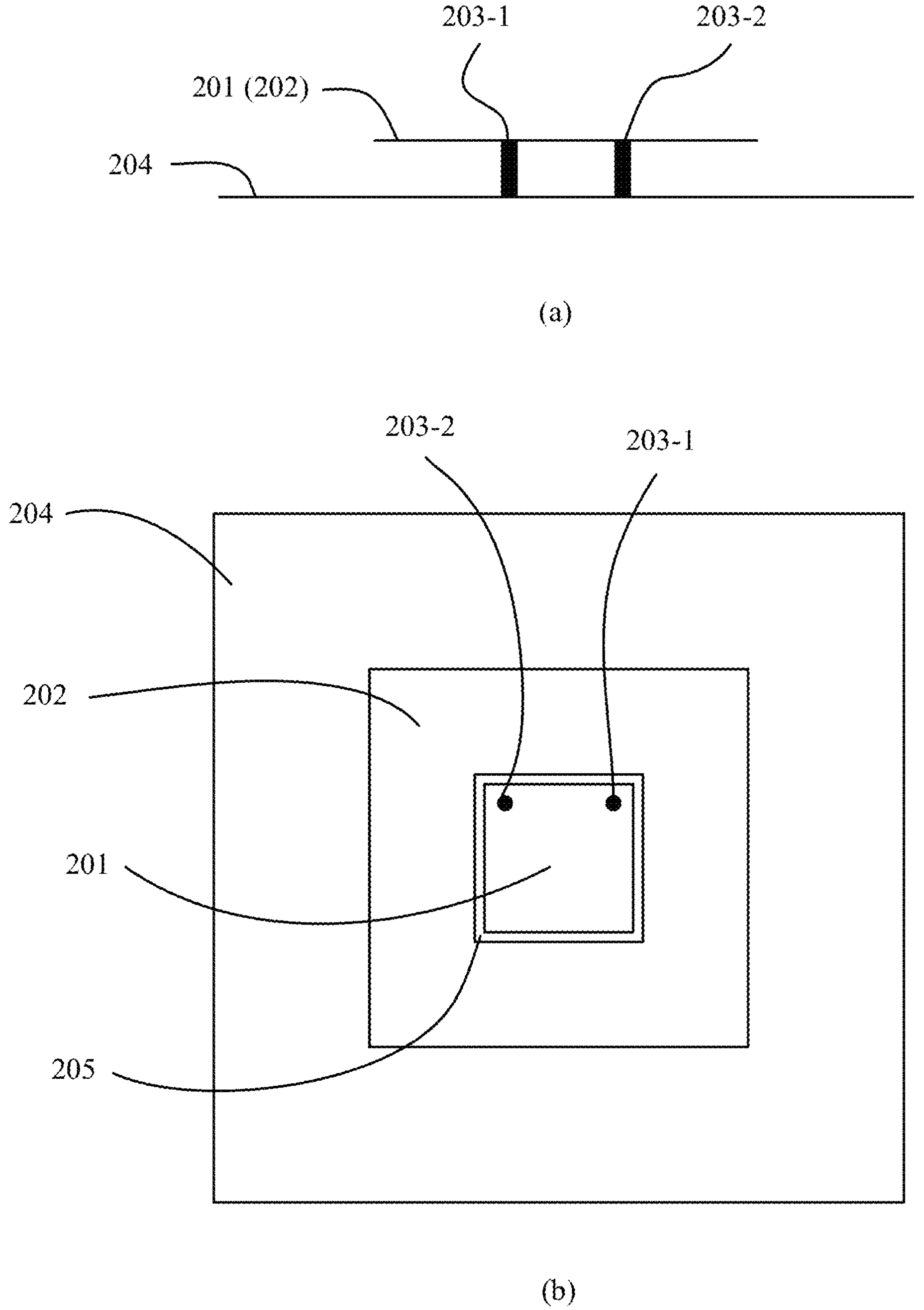
FIG. 2 is a schematic diagram of a structure of a multi-band dual-polarized antenna according to an embodiment of this application.

FIG. 2 is a schematic diagram of a structure of a multi-band dual-polarized antenna according to an embodiment of this application. (a) in FIG. 2 is a side view of the antenna, and (b) in FIG. 2 is a top view of the antenna.

As shown in (a) in FIG. 2, the antenna has a two-layer structure, and includes a first radiator 201 and a second radiator 202 that are disposed on a same plane. It may be understood that, because radiation of the antenna needs to be excited by using an electrical signal, a reference ground needs to be used as a 0 potential reference. In this embodiment of this application, as shown in (a) in FIG. 2, a substrate 204 may be disposed under the plane on which the first radiator 201 and the second radiator 202 are disposed. The substrate 204 may be covered with a conductive material with a large area (for example, larger than the second radiator 202), to serve as the reference ground. In addition, two feeding terminals are led out from the substrate 204 and are coupled to two feeding ports 203-1 and 203-2 of the first radiator 201 respectively, to feed an electrical signal to the first radiator 201.

As shown in (b) in FIG. 2, in the antenna, the first radiator 201 with a rotationally symmetric structure and the second radiator 202 with a rotationally symmetric structure may be disposed. The second radiator 202 is annular, the first radiator 201 and the second radiator 202 are coplanar, the first radiator 201 is disposed in the second radiator 202, and an annular gap 205 is provided between the first radiator 201 and the second radiator 202.

In the multi-band dual-polarized antenna provided in this embodiment of this application, the feeding ports on the first radiator 201 are distributed in a rotationally symmetric manner with respect to a geometric center of the first radiator 201 by +90°/−90°, so that after the feeding terminals feed the electrical signal to the first radiator 201 by using the feeding ports 203-1 and 203-2, currents perpendicular to each other can be formed on the first radiator 201. It should be noted that, in this application, a location of the geometric center corresponding to the first radiator varies with a form of the first radiator. For example, when the first radiator has a circular structure, the geometric center corresponding to the first radiator is a circle center of the first radiator. For another example, when the first radiator is of a regular polygon structure, the geometric center corresponding to the first radiator is a point that is in the first radiator and that has an equal distance to each side. In addition, because the two feeding ports are 90° rotationally symmetric relative to each other with respect to the geometric center of the first radiator, when a location of one feeding port is rotated by 90° by using the geometric center as a circle center, the location of the feeding port can coincide with a location of the other feeding port. With reference to (b) in FIG. 2, an example in which the first radiator 201 is of a square structure is used. The feeding port 203-1 may be disposed on the upper right of the first radiator 201, and the feeding port 203-2 may be disposed on the upper left to be 90° rotationally symmetric to the feeding port 203-1. Certainly, the feeding port 203-2 may alternatively be disposed on the lower right to be 90° rotationally symmetric to the feeding port 203-1. Alternatively, the feeding ports 203-1 and 203-2 may be respectively disposed at other locations to be 90° rotationally symmetric to each other on the first radiator 201. A specific location may be flexibly selected based on an actual situation. This is not limited in this embodiment of this application.

In addition, in the multi-band dual-polarized antenna provided in this embodiment of this application, the first radiator 201 and the second radiator 202 each have a rotationally symmetric structure, so that the first radiator 201 and the second radiator 202 can correspondingly generate orthogonal electromagnetic waves for radiation under excitation of the electrical signal fed by the two feeding terminals. It should be understood that a graph having a rotationally symmetric structure is a graph having the following feature: a new graph obtained after rotation about a point on a plane by a specific angle totally coincides with a graph obtained before rotation. In an example, the first radiator 201 in this embodiment of this application may be in the shape of a circle, a regular triangle, a square, a regular pentagon, a regular hexagon, or another regular polygon. In addition, the second radiator 202 may also be an annular structure having the foregoing feature. Details are not described again in this embodiment of this application. With reference to (b) in FIG. 2, in some embodiments, the first radiator 201 and the second radiator 202 may be square structures. A conductive material is disposed on each of the first radiator 201 and the second radiator 202, to receive a fed electrical signal and perform radiation. The first radiator and the second radiator are disposed on a same plane, the first radiator is located in the second radiator, and the first radiator and the second radiator are separated by the annular gap 205, without a connection to each other.

Based on the foregoing description, when the antenna provided in this embodiment of this application works, the first radiator 201 may generate currents perpendicular to each other under excitation of the two feeding ports. Because of the rotationally symmetric structure of the first radiator 201, an excitation signal may be fed to the second radiator 202 evenly by spatial feeding through the annular gap 205. In other words, under excitation of the first radiator 201, induced currents with basically consistent intensity can be generated at the inner edges of the second radiator 202. Because the second radiator 202 has a rotationally symmetric structure, and electrical signals whose directions are perpendicular to each other exist on the first radiator 201 used for excitation, currents that are perpendicular to each other can also be excited on the second radiator 202. In addition, current distributions perpendicular to each other also exist on two annular edges enclosing the annular gap 205. Therefore, both the second radiator 202 and the annular gap 205 can perform dual-polarized radiation. In addition, because a size of the second radiator 202 is different from a size of the annular gap 205, different frequency bands can be covered, that is, two or more frequency bands can be covered at the same time.

Figure 3:
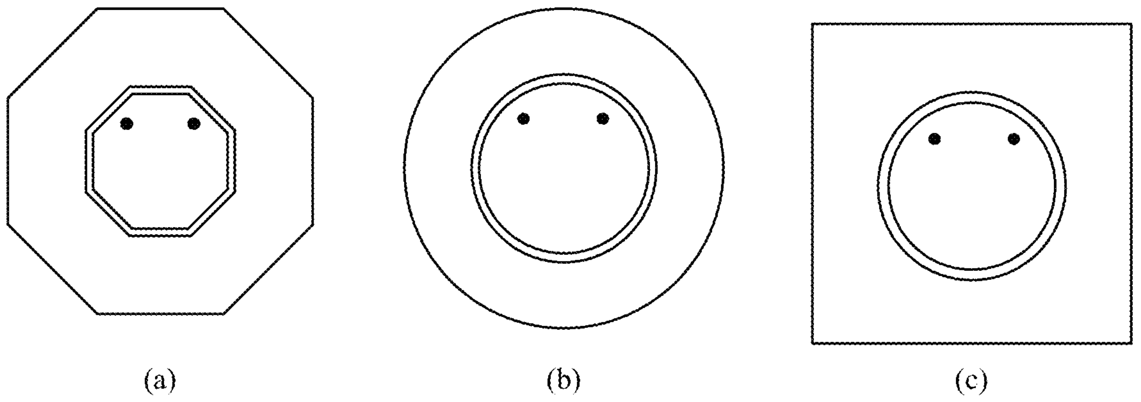
FIG. 3 is a schematic diagram of a multi-band dual-polarized antenna according to an embodiment of this application.

It should be noted that, in FIG. 1, only an example in which the first radiator 201 and the second radiator 202 are of square structures is used for description. In some other implementations, the first radiator 201 and the second radiator 202 each may have another structure having a rotationally symmetric feature. For example, refer to FIG. 3. As shown in (a) in FIG. 3, the first radiator 201 and the second radiator 202 may have regular hexagon structures. As shown in (b) in FIG. 3, the first radiator 201 and the second radiator 202 may have circular structures. Certainly, the first radiator 201 may alternatively have a structure different from that of the second radiator 202. As shown in (c) in FIG. 3, the first radiator 201 may be of a square structure, and the second radiator 202 may have a circular structure. Structures of the first radiator 201 and the second radiator 202 may be flexibly selected based on an actual scenario. This is not limited in this embodiment of this application. For ease of description, the following uses an example in which both the first radiator 201 and the second radiator 202 are square structures for description.

When a signal is fed to the first radiator 201 through one feeding port, the first radiator 201 may generate a current signal. Through spatial coupling, the current signal may be fed to the second radiator 202, to generate a corresponding current signal. Therefore, the antenna may convert currents at different locations into electromagnetic waves, and cover at least three frequency bands. For example, frequencies of the three covered frequency bands in ascending order are respectively a frequency band 1, a frequency band 2, and a frequency band 3. Directions of currents at two ends of the gap between the first radiator 201 and the second radiator 202 are opposite, so that an intermediate-frequency resonance of the antenna, for example, a resonance in the frequency band 2, may be formed. Because the second radiator 202 is large, a current distributed on the second radiator 202 may form a low-frequency resonance of the antenna, for example, a resonance in the frequency band 1. In addition, the current distributed on the second radiator 202 may further excite a higher-order mode, to form a high-frequency resonance of the antenna, for example, a resonance in the frequency band 3. In this way, the antenna covers at least three frequency bands.

It should be noted that, because a current also exists on the first radiator 201, a corresponding resonance can also be formed. However, because the first radiator 201 is small, a resonance frequency formed by the first radiator 201 is high (for example, above 6 G). If an electrical length of the first radiator 201 is increased through tuning, and a corresponding resonance frequency is lowered, the antenna can implement coverage of four frequency bands, or expand an existing resonance frequency band.

Generally, to meet requirements for operating frequency bands in different scenarios, the antenna needs to be enabled to work in a specific frequency range (that is, a frequency band). According to the multi-band dual-polarized antenna provided in this embodiment of this application, an operating frequency band may be adjusted by adjusting sizes of locations corresponding to the frequency band 1, the frequency band 2, and the frequency band 3. For example, the required frequency band is a Wi-Fi dual-band (that is, a 2.4 G frequency band, a 5 G low band, and a 5 G high band). A perimeter of an outer contour of the second radiator 202 is adjusted to twice a wavelength corresponding to a frequency band (for example, the 2.4 G frequency band) with the lowest frequency in the three required frequency bands, that is, each side length is ¼ of a wavelength corresponding to the 2.4 G frequency band. In this way, the frequency band 1 can be adjusted to a 2.4 G frequency band range, so that the antenna covers the 2.4 G frequency band. A perimeter of an inner contour of the second radiator 202 is set to twice a wavelength corresponding to a frequency band (for example, the 5 G low band) with a moderate frequency in the three required frequency bands, that is, each side length is ¼ of a wavelength corresponding to the 5 G low band. In this way, the frequency band 2 can be adjusted to a 5 G low band range, so that the antenna covers the 5 G low band.

It should be noted that, as described above, a resonance in the 5 G high band is generated by a higher-order mode of a 2.4 G resonance. Therefore, when the perimeter of the outer contour of the second radiator 202 is adjusted to ¼ of the wavelength corresponding to the frequency band (for example, the 2.4 G frequency band) with the lowest frequency in the three required frequency bands, a resonance 3 may also be adjusted to near the 5 G high band. In this embodiment of this application, after the size of the antenna is adjusted, capacitance/inductance matching may be further performed on the antenna, so that the three resonances can accurately cover a corresponding frequency band.

In this embodiment of this application, a plurality of different methods are provided to adjust sizes such as the perimeter of the outer contour and perimeter of the inner contour of the second radiator 202.

Figure 4:
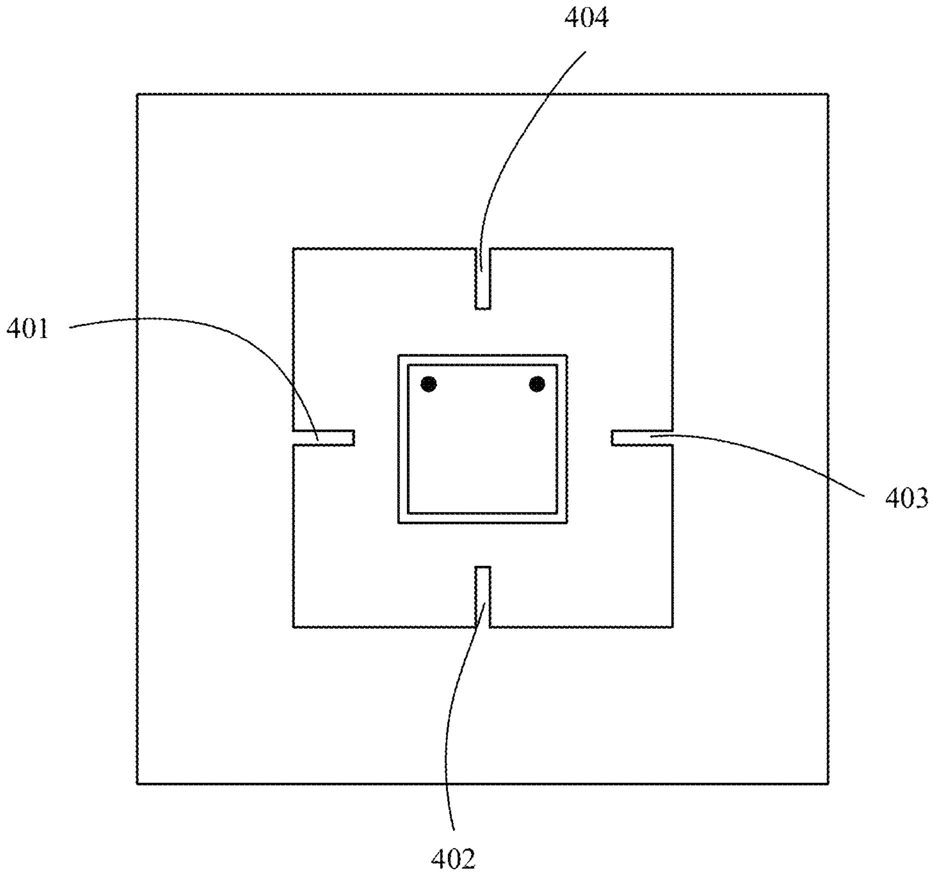
FIG. 4 is a schematic diagram of another multi-band dual-polarized antenna according to an embodiment of this application.

For example, in some embodiments, a non-run-through gap may be provided on the second radiator 202, to increase an electrical length of a current on the outer contour. As shown in FIG. 4, an example in which the perimeter of the outer contour of the second radiator 202 needs to be increased is used. A gap 401, a gap 402, a gap 403, and a gap 404 may be provided on each side. As shown in FIG. 4, each gap is provided on an outer edge of the second radiator 202, and intersects the outer contour of the second radiator 202. It may be understood that, because an area of the second radiator 202 directly affects bandwidths of a resonance 1 and the resonance 3 corresponding to the second radiator 202, by using the solution in this example, the perimeter of the outer contour can be increased while the area of the second radiator 202 is ensured.

It should be noted that FIG. 4 is described by using an example in which a gap is provided on each side of the second radiator 202. In some other implementations, a gap may also be separately provided on one, two, or three sides of the second radiator 202, to increase the perimeter of the outer contour.

Figure 5:
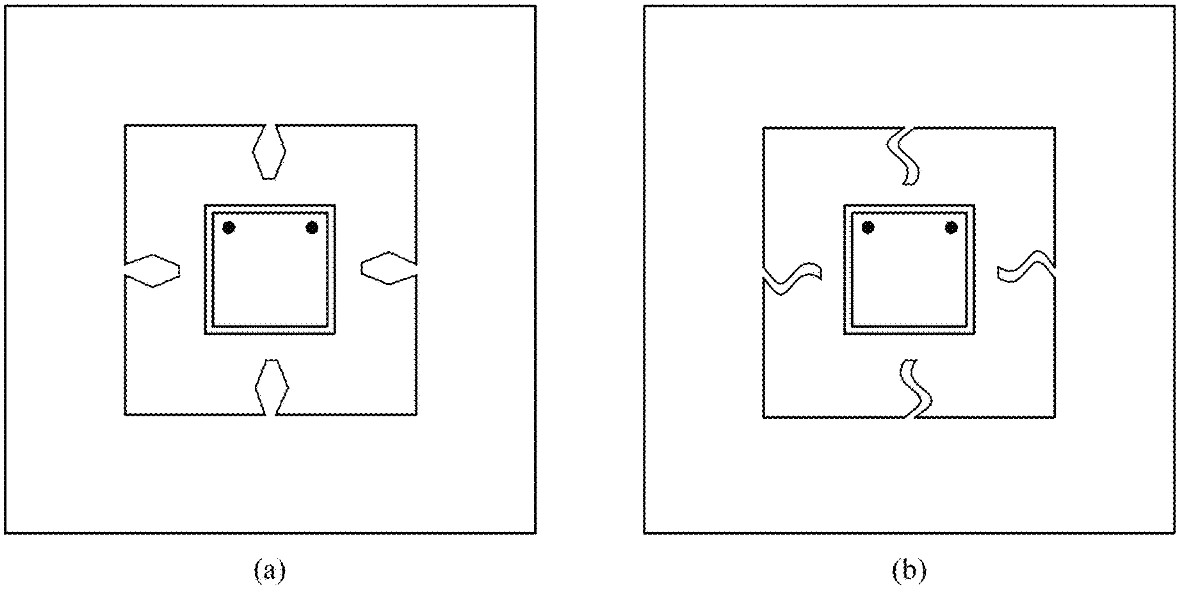
FIG. 5 is a schematic diagram of another multi-band dual-polarized antenna according to an embodiment of this application.

It should be understood that, in the foregoing description, an example in which the gap is in a rectangle shape shown in FIG. 4 is used for description. In an actual implementation process, a specific shape of the gap is not required. For example, a shape of the gap may be a shape shown in (a) or (b) shown in FIG. 5, or may be another regular or irregular shape. This is not limited in this embodiment of this application.

In some other embodiments, the perimeter of the outer contour of the second radiator may be increased by increasing the area of the second radiator 202. By using this solution, because a radiation area of the second radiator 202 can be increased, a bandwidth of a corresponding resonance can be effectively expanded while frequency domain locations of the resonance 1 and the resonance 3 are adjusted.

In some other embodiments, the perimeter of the outer contour of the second radiator 202 may be further increased through matched tuning. For example, an inductor may be connected in series, and/or a capacitor may be connected in parallel at an appropriate location, to increase an equivalent electrical length of the second radiator 202, and achieve an effect similar to that of increasing the perimeter of the outer contour of the second radiator 202.

In a specific implementation process, one or more methods in the foregoing examples may be flexibly used to adjust the perimeter of the outer contour of the second radiator 202. It may be understood that, for adjustment of the perimeter of the inner contour of the second radiator 202, refer to the foregoing method for adjusting the perimeter of the outer contour. Details are not described herein again.

It should be noted that, based on the foregoing description, the annular gap 205 between the first radiator 201 and the second radiator 202 plays a very important role during coupled feeding and radiation. Therefore, based on a large quantity of experimental verifications, in this embodiment of this application, a width of the annular gap 205 may be set to between 0.5 millimeter and 1.5 millimeters, so as to better excite the annular gap 205 between the first radiator 201 and the second radiator 202, and the second radiator 202 for radiation. In addition, because impact of the reference ground on antenna radiation is also very important, a distance between the substrate 204 and a plane on which the first radiator 201 and the second radiator 202 are located may be set to between 3 millimeters and 7 millimeters, so as to enable the antenna provided in this embodiment of this application to radiate better.

To enable a person of ordinary skill in the art to more clearly know a radiation effect of the multi-band dual-polarized antenna provided in this embodiment of this application, the following provides an example for description with reference to an example and a simulation result. For example, the antenna has a structure shown in FIG. 4, a perimeter of the outer contour of the second radiator 202 is about twice a wavelength corresponding to a 2.4 G frequency band, a perimeter of the inner contour of the second radiator 202 is about twice a wavelength corresponding to a 5 G low band, a width of the annular gap 205 is 0.8 millimeter, and a distance between the substrate 204 and a plane on which the first radiator 201 is located is 5 millimeters.

Figure 6:
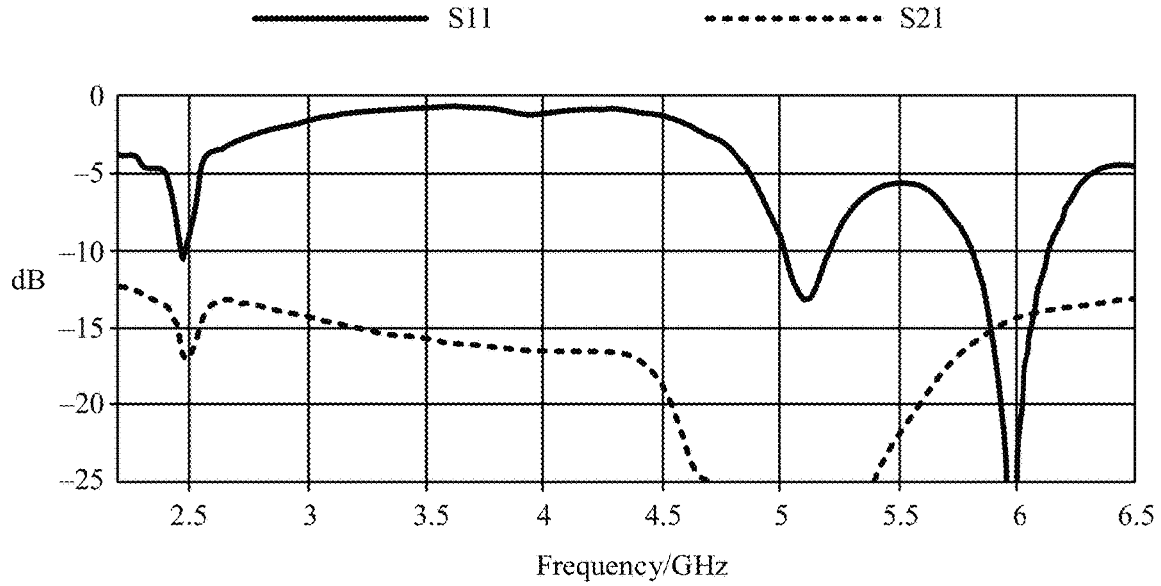
FIG. 6 is a schematic diagram of an S parameter simulation of a multi-band dual-polarized antenna according to embodiment of this application.

FIG. 6 shows an S parameter simulation result of an antenna having the foregoing structure. As shown in FIG. 6, it can be obviously learned from a return loss (S11) that the antenna has significant depressions in frequency bands corresponding to the 2.4 G frequency band, 5 G low band, and 5 G high band. Therefore, it can be determined that a radiation frequency band of the antenna can cover the foregoing three frequency bands. Based on an isolation (S21) simulation result in FIG. 6, it can be learned that isolation between two feeding ports is lower than −13 dB in an operating frequency band (for example, the 2.4 G frequency band, the 5 G low band, and the 5 G high band). Therefore, the two feeding ports can implement radiations that do not affect each other.

Figure 7B:
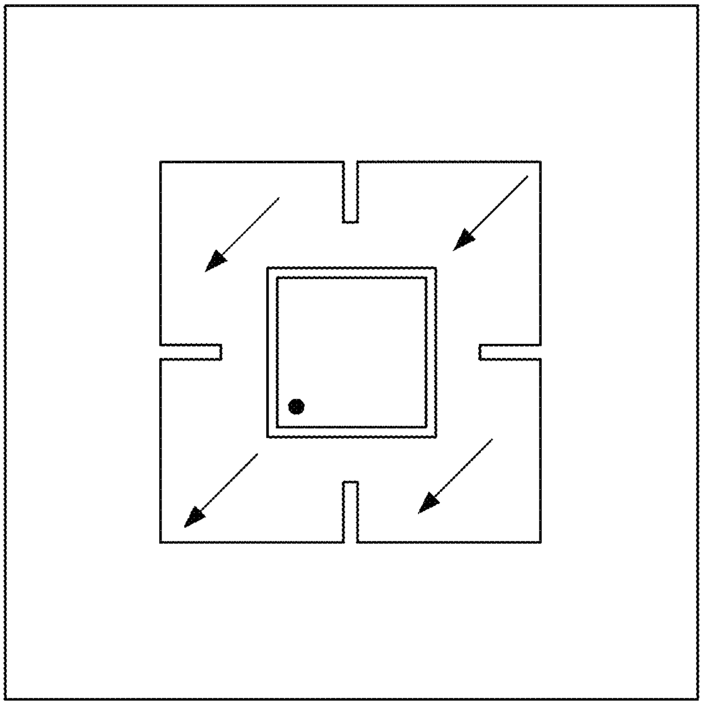
FIG. 7(*a*), FIG. 7(*b*) and FIG. 7(*c*) are a schematic diagram of operating characteristics of a multi-band dual-polarized antenna in a 2.4 G frequency band according to an embodiment of this application.
Figure 7A:
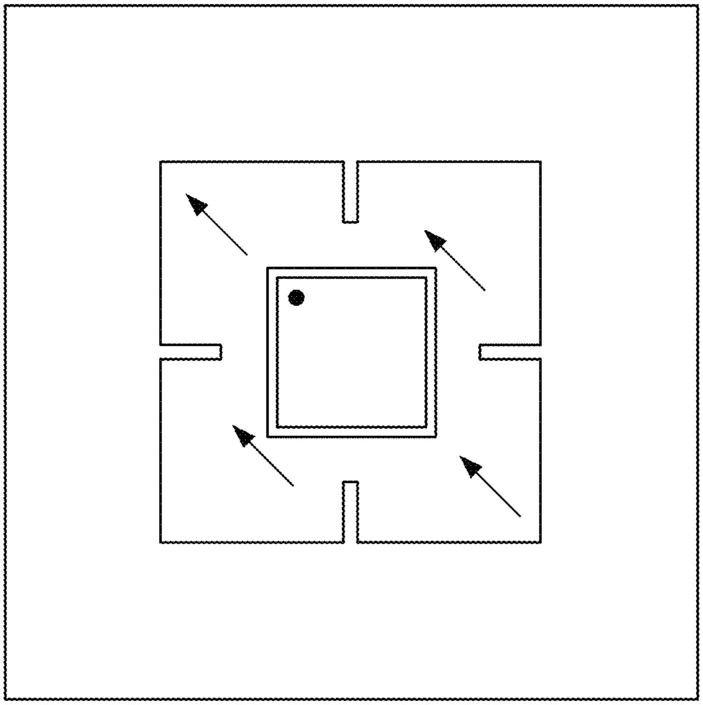
Figure 7C:
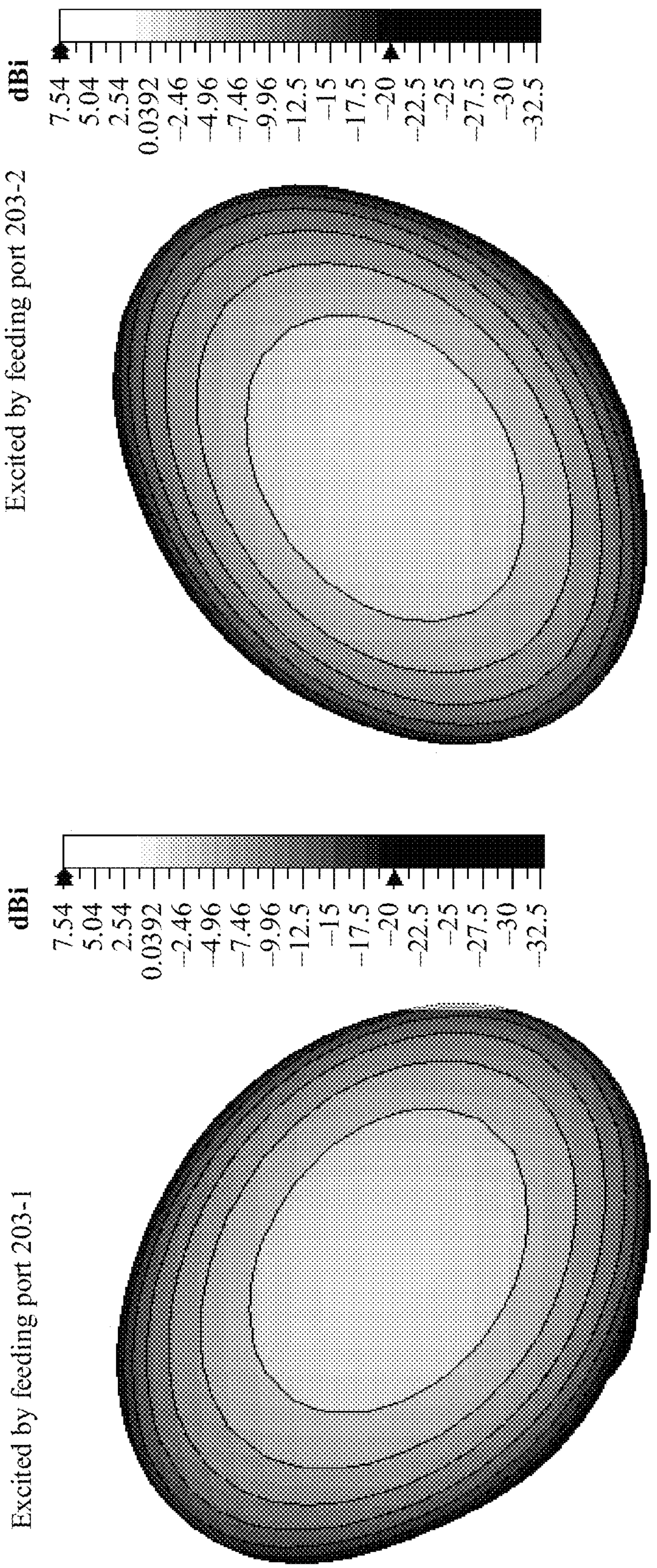

This example also provides current distributions in different operating frequency bands to verify the preceding description. FIG. 7(*a*) and FIG. 7(*b*) show current distributions in the 2.4 G frequency band. As shown in FIG. 7(*a*), in this frequency band, a current excited by the feeding port 203-1 is mainly distributed on the second radiator 202. At a moment shown in the figure, a current flow direction is from the lower left to the upper right. As shown in FIG. 7(*b*), in this frequency band, a current excited by the feeding port 203-2 is mainly distributed on the second radiator 202. At a moment shown in the figure, a current flow direction is from the lower right to the upper left. A gain simulation result of the antenna is shown in FIG. 7(*c*). It can be learned that the antenna can perform orthogonal radiation in the 2.4 G frequency band under excitation of the two ports. It can be learned that directions of currents excited by the two ports are perpendicular to each other. Therefore, orthogonal electromagnetic wave radiation can be performed, so that the antenna has a dual-polarized radiation characteristic in the 2.4 G frequency band.

Figure 8B:
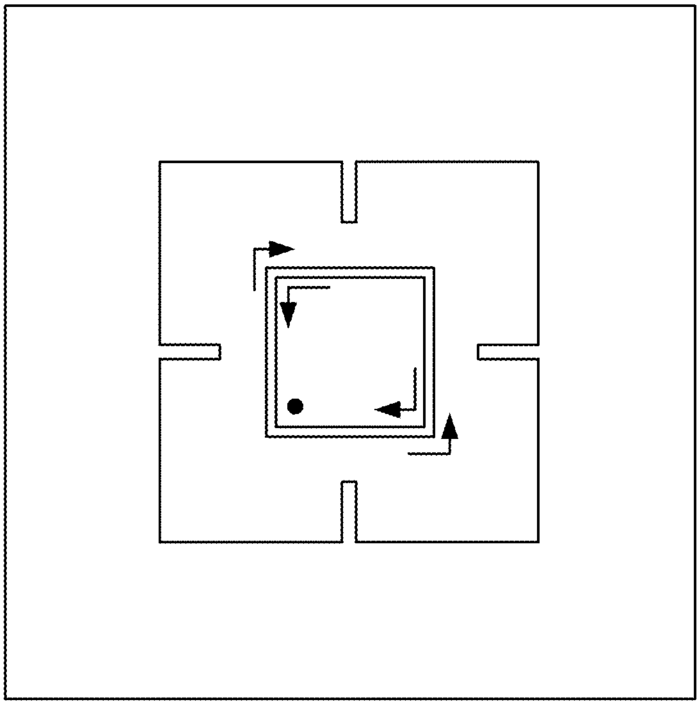
FIG. 8(*a*), FIG. 8(*b*) and FIG. 8(*c*) are a schematic diagram of operating characteristics of a multi-band dual-polarized antenna in a 5 G low band according to an embodiment of this application.
Figure 8A:
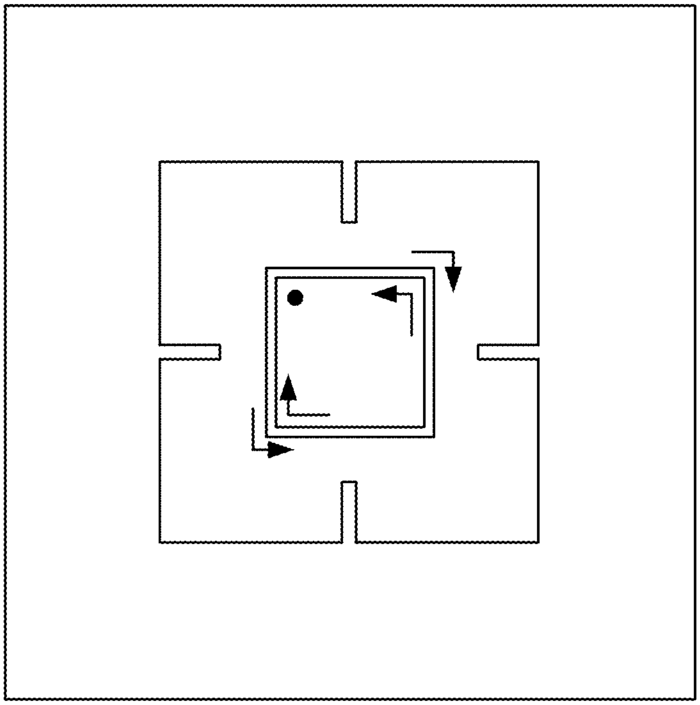
Figure 8C:
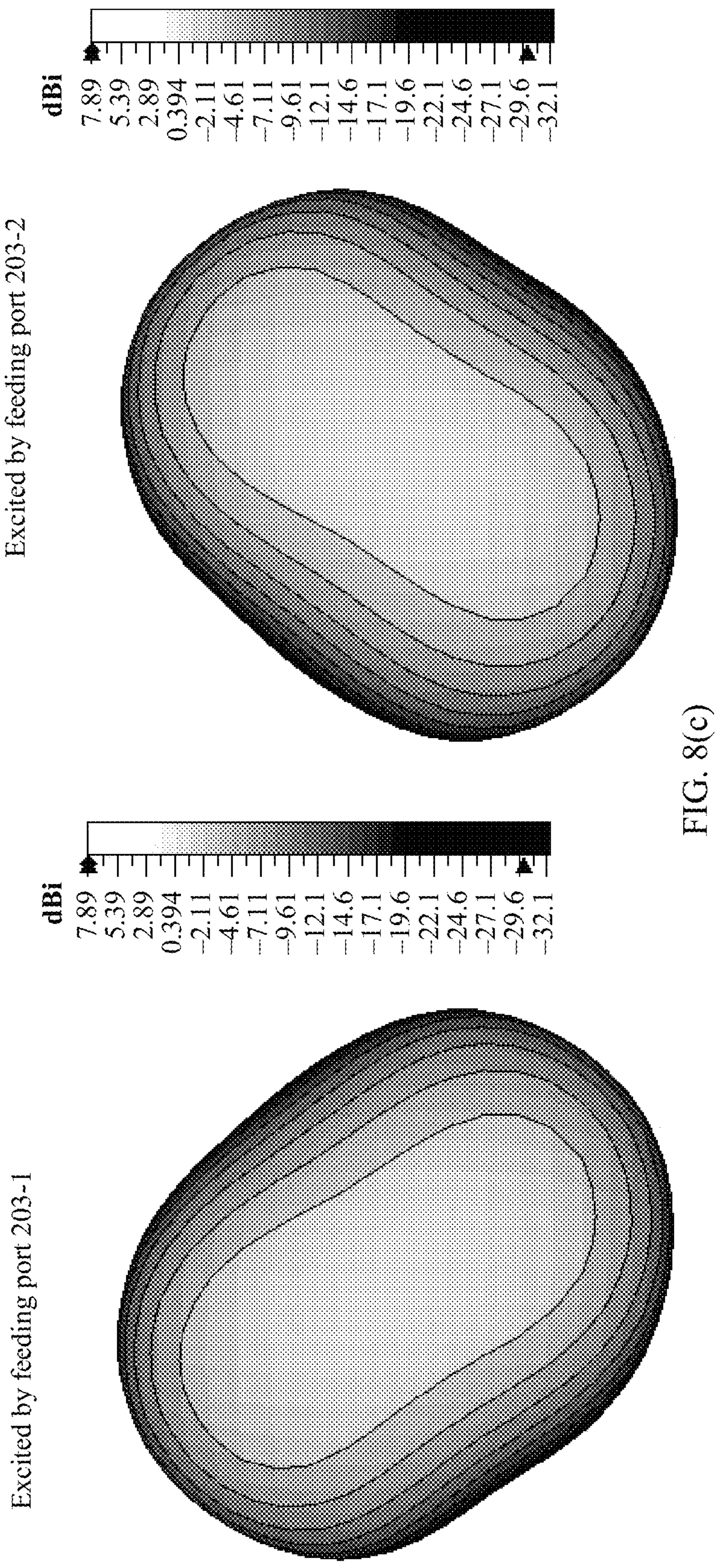

FIG. 8(*a*) and FIG. 8(*b*) show current distributions in a 5 G low band. As shown in FIG. 8(*a*), in this frequency band, a current excited by the feeding port 203-1 is mainly distributed on the annular gap 205, and an effect thereof is similar to radiation of a slot antenna. At the moment shown in the figure, the current flows counterclockwise on the upper left of the gap and clockwise on the lower right of the gap. As shown in FIG. 8(*b*), in this frequency band, a current excited by the feeding port 203-2 is mainly distributed on the annular gap 205, and an effect thereof is similar to radiation of a slot antenna. At the moment shown in the figure, the current flows clockwise on the upper right of the gap and anticlockwise on the lower left of the gap. A gain simulation result of the antenna is shown in FIG. 8(*c*). It can be learned that the antenna can perform orthogonal radiation in the 5 G low band under excitation of the two ports. It can be learned that strong current points excited by the two ports are distributed at different locations of the gap, and connection lines of the strong current points are perpendicular to each other. Therefore, orthogonal electromagnetic wave radiation can be performed, so that the antenna has a dual-polarized radiation characteristic in the 5 G low band.

Figure 9B:
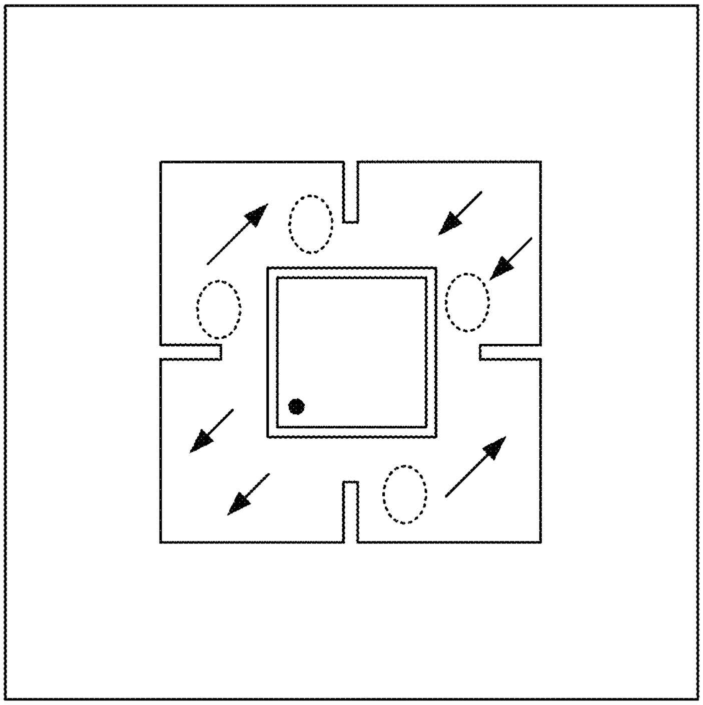
FIG. 9(*a*), FIG. 9(*b*) and FIG. 9(*c*) are a schematic diagram of operating characteristics of a multi-band dual-polarized antenna in a 5 G high band according to an embodiment of this application.
Figure 9A:
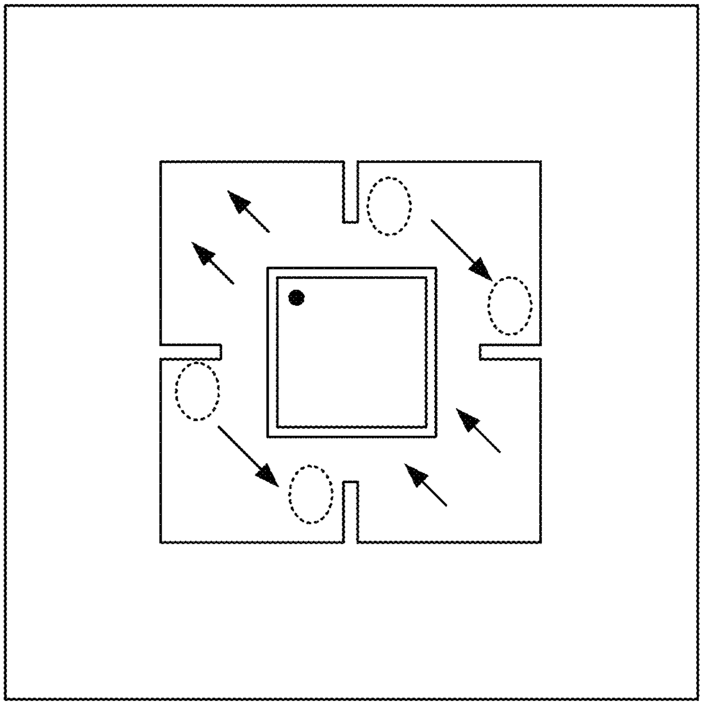
Figure 9C:
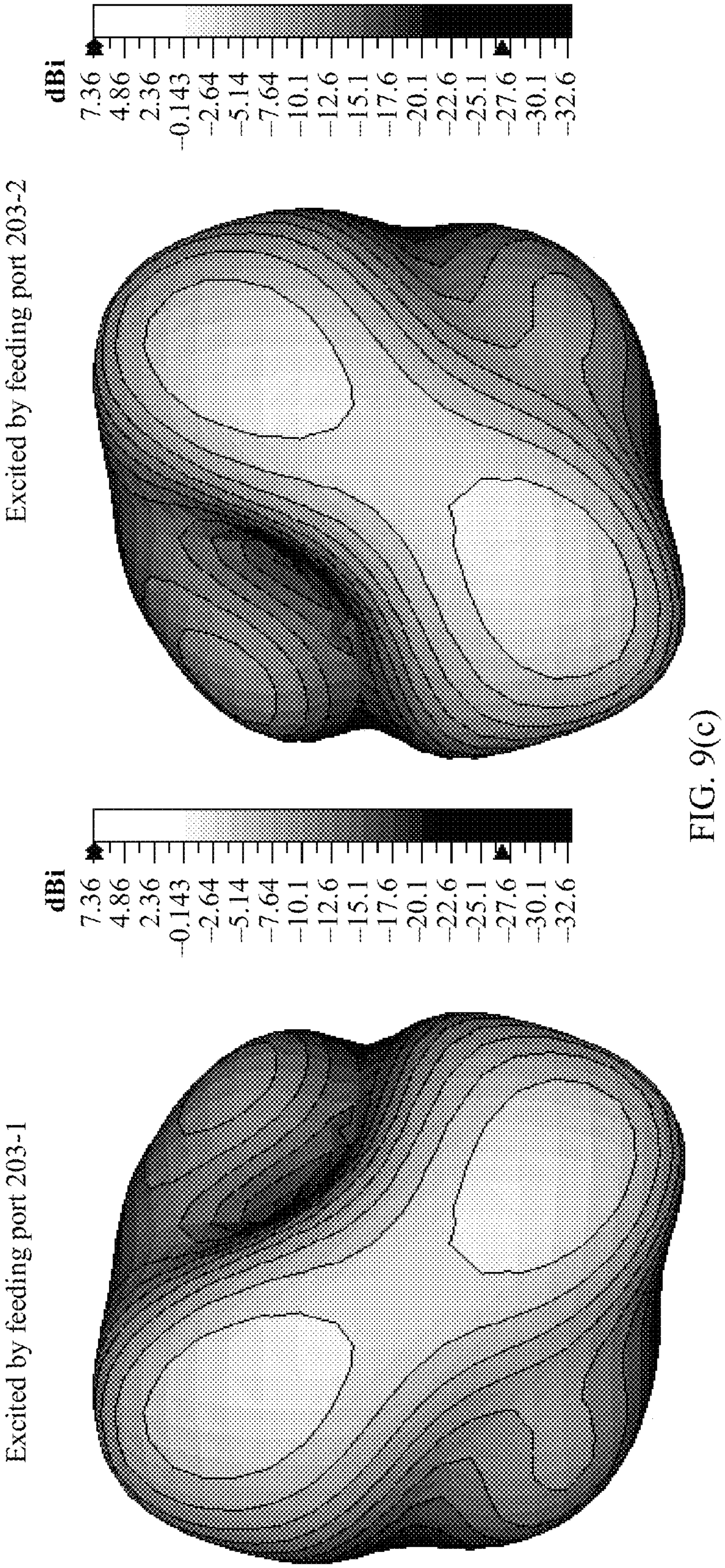

FIG. 9(*a*) and FIG. 9(*b*) show current distributions in a 5 G high band. As shown in FIG. 9(*a*), in this frequency band, a current excited by the feeding port 203-1 is mainly distributed on the second radiator 202. Four current reverse points (locations shown by dashed circles in the figure) appear on the second radiator, and current flow directions at two ends herein are opposite. This is a typical feature of a higher-order mode resonance. Similarly, under excitation of the feeding port 203-2 shown in FIG. 9(*b*), a current excited by the feeding port 203-2 is mainly distributed on the second radiator 202 on which four similar current reverse points also appear. By comparing FIG. 9(*a*) with FIG. 9(*b*), it can be learned that flow directions of currents generated under excitation of different ports at different locations on the second radiator 202 are perpendicular to each other. A gain simulation result of the antenna is shown in FIG. 9(*c*). It can be learned that the antenna can perform orthogonal radiation in the 5 G high band under excitation of the two ports. Therefore, orthogonal electromagnetic wave radiation can be performed, so that the antenna has a dual-polarized radiation characteristic in the 5 G high band.

Based on the foregoing description, the multi-band dual-polarized antenna provided in this embodiment of this application can implement multi-band dual-polarized radiation. In addition, because there is only one layer of structure except the substrate, complexity of the antenna can be effectively reduced, processing costs can be reduced, and space required by the antenna can be significantly reduced, so that the antenna can be more generally applicable to an electronic device.

It should be noted that, based on the foregoing multi-band dual-polarized antenna, the multi-band dual-polarized antenna can also be applied to a MIMO system to transmit and receive a signal.

For example, in some embodiments, an example in which the MIMO system needs to transmit a first signal and a second signal is used. The first signal may be fed to the feeding port 203-1, and the second signal may be fed to the feeding port 203-2. Because the antenna can convert signals fed to the two feeding ports into orthogonal electromagnetic waves for dual-polarized radiation, the first signal and the second signal can be transmitted.

It may be understood that, in some other embodiments, when the MIMO system needs to receive a signal, electromagnetic waves corresponding to at least two different signals may also be received by using the antenna having the foregoing composition, and corresponding currents are transmitted to back-end components by using different feeding ports, for example, a radio frequency component and/or a system on chip (System on Chip, SOC) in the MIMO system, to facilitate parsing and processing. In this way, signal receiving of the MIMO system is implemented.

Embodiments of this application further provide an electronic device. The electronic device may be provided with one or more antennas described in any one of FIG. 2 to FIG. 5, and another component configured to cooperate with the antenna to transmit a signal.

Figure 10:
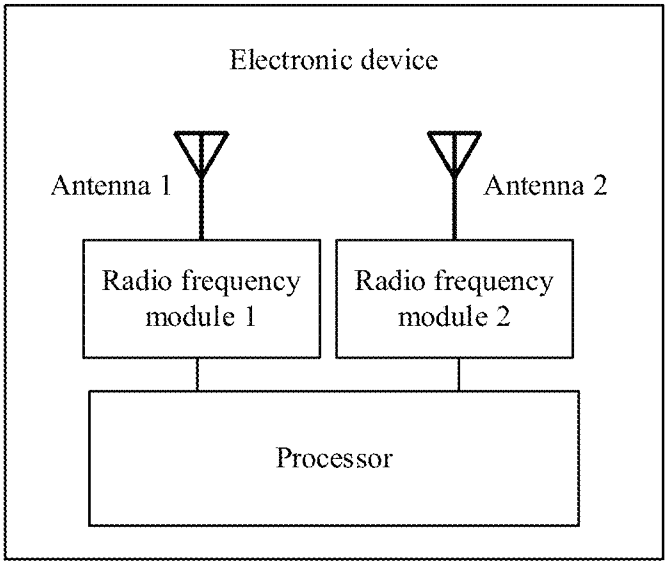
FIG. 10 is a schematic composition diagram of an electronic device according to an embodiment of this application.

In an example, FIG. 10 is a schematic composition diagram of an electronic device according to an embodiment of this application. For example, the electronic device includes two antennas. As shown in FIG. 10, the electronic device may include an antenna 1 and an antenna 2, a radio frequency module corresponding to each antenna, for example, a radio frequency module 1 and a radio frequency module 2, and a processor coupled to the radio frequency module 1 and the radio frequency module 2.

Either of the antenna 1 and the antenna 2, or the antenna 1 and the antenna 2 may be the multi-band dual-polarized antenna formed in any one of FIG. 2 to FIG. 5. The radio frequency module 1 cooperates with the antenna 1 to implement coverage in a frequency band corresponding to the antenna 1. The radio frequency module 2 cooperates with the antenna 2 to implement coverage in a frequency band corresponding to the antenna 2. The processor coupled to the radio frequency module 1 and the radio frequency module 2 may be an SOC, and is configured to cooperate with the radio frequency module 1 and the radio frequency module 2 to perform digital domain processing and analog domain processing on a corresponding signal. For example, the SOC may send a signal 1 to the antenna 1 by using the radio frequency module 1, so as to transmit the signal 1 by using the antenna 1. The SOC may further send a signal 2 to the antenna 2 by using the radio frequency module 2, so as to transmit the signal 2 by using the antenna 2. For another example, the antenna 1 may convert a received electromagnetic wave into a corresponding electrical signal, and send the electrical signal to the SOC by using the radio frequency module 1, so that the SOC cooperates with the radio frequency module 1 to parse the electrical signal. The antenna 2 may convert a received electromagnetic wave into a corresponding electrical signal, and send the electrical signal to the SOC by using the radio frequency module 2, so that the SOC cooperates with the radio frequency module 2 to parse the electrical signal.

In a specific implementation, the electronic device may be a router that provides a Wi-Fi connection, to provide good Wi-Fi signal coverage and signal quality.

It should be understood that, according to the multi-band dual-polarized antenna provided in this embodiment of this application, because both the first radiator and the second radiator (and the annular gap between the first radiator and the second radiator) are disposed on a same plane, only one plane needs to be processed during production and processing, so that production costs and antenna complexity can be effectively reduced, and significant beneficial effects are achieved for controlling antenna costs and improving quality control. In addition, because at least three frequency bands can be covered, and the dual-polarized radiation characteristic can be provided in a corresponding frequency band, compared with a common antenna, the multi-band dual-polarized antenna provided in this embodiment of this application can provide better signal coverage and signal quality.

Although this application is described with reference to specific features and embodiments thereof, it is clear that various modifications and combinations may be made to them without departing from the scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An antenna, comprising:

a first radiator including a first rotationally symmetric structure; and a second radiator including a second rotationally symmetric structure, wherein the first radiator includes two feeding ports that are 90° rotationally symmetric with respect to a geometric center of the first radiator, wherein the second radiator is annular, the first radiator and the second radiator are coplanar, the first radiator is disposed in the second radiator, and an annular gap is between the first radiator and the second radiator, and wherein a first operating frequency band of the second radiator comprises a first frequency band, and a second operating frequency band of the annular gap comprises a second frequency band different from the first frequency band to ensure multi-frequency coverage.

2. The antenna according to claim 1, wherein the first operating frequency band of the second radiator further comprises a third frequency band.

3. The antenna according to claim 2, wherein the first frequency band is smaller than the second frequency band, and the second frequency band is smaller than the third frequency band.

4. The antenna according to claim 1, wherein a first perimeter of an outer contour of the second radiator is twice a first wavelength corresponding to the first frequency band, and a second perimeter of the annular gap is twice a second wavelength corresponding to the second frequency band.

5. The antenna according to claim 1, wherein a width range of the annular gap is between 0.5 millimeter and 1.5 millimeters.

6. The antenna according to claim 1, wherein the antenna further comprises a reference ground disposed in parallel with the first radiator, and a distance range between the reference ground and the first radiator is between 3 millimeters and 7 millimeters.

7. The antenna according to claim 6, wherein a projection area of the second radiator on the reference ground is smaller than an area of the reference ground.

8. The antenna according to claim 1, wherein the first radiator is made of a square conductive material, and wherein a corresponding length of each side of the first radiator is a quarter of a wavelength corresponding to the second frequency band.

9. The antenna according to claim 1, wherein the second radiator is made of a square ring-shaped conductive material that is hollow inside, and wherein a length of an outer contour of the second radiator is a quarter of a wavelength corresponding to the first frequency band.

10. The antenna according to claim 9, wherein a gap is provided on each side of the outer contour of the second radiator, and wherein the gap includes an outward opening.

11. The antenna according to claim 1, wherein the second radiator is a passive parasitic structure.

12. The antenna according to claim 1, wherein a first shape of the first radiator does not match a second shape of the second radiator.

13. An electronic device, comprising:

an antenna, wherein the antenna comprises:

a first radiator including a first rotationally symmetric structure; and a second radiator including a second rotationally symmetric structure, wherein the first radiator includes two feeding ports that are 90° rotationally symmetric with respect to a geometric center of the first radiator, wherein the second radiator is annular, the first radiator and the second radiator are coplanar, the first radiator is disposed in the second radiator, and an annular gap is between the first radiator and the second radiator, and wherein a first operating frequency band of the second radiator comprises a first frequency band, and a second operating frequency band of the annular gap comprises a second frequency band different from the first frequency band to ensure multi-frequency coverage.

14. The electronic device according to claim 13, wherein the first operating frequency band of the second radiator further comprises a third frequency band.

15. The electronic device according to claim 13, wherein a first perimeter of an outer contour of the second radiator is twice a first wavelength corresponding to the first frequency band, and a second perimeter of the annular gap is twice a second wavelength corresponding to the second frequency band.

16. The electronic device according to claim 13, wherein a width range of the annular gap is between 0.5 millimeter and 1.5 millimeters.

17. The electronic device according to claim 13, wherein the antenna further comprises a reference ground disposed in parallel with the first radiator, and a distance range between the reference ground and the first radiator is between 3 millimeters and 7 millimeters.

18. The electronic device according to claim 13, wherein the first radiator is made of a square conductive material, and wherein a corresponding length of each side of the first radiator is a quarter of a wavelength corresponding to the second frequency band.

19. The electronic device according to claim 13, wherein the second radiator is made of a square ring-shaped conductive material that is hollow inside, and wherein a length of an outer contour of the second radiator is a quarter of a wavelength corresponding to the first frequency band.

20. The electronic device according to claim 13, wherein the electronic device feeds a multiple-input multiple-output (MIMO) signal to the antenna through the two feeding ports.

* * * * *